(12) United States Patent
Young, III

(10) Patent No.: US 6,224,962 B1
(45) Date of Patent: May 1, 2001

(54) FLOOR MAT COVER

(76) Inventor: Surry Young, III, 4312 Glenndale Rd., Bowie, MD (US) 20720

( * ) Notice: Subject to any disclaimer, the term of this patent is extended or adjusted under 35 U.S.C. 154(b) by 0 days.

(21) Appl. No.: 09/176,839

(22) Filed: Oct. 22, 1998

(51) Int. Cl.[7] .................................................. B62D 25/20
(52) U.S. Cl. .............................. 428/76; 428/95; 428/120; 428/136; 428/192; 428/195; 296/97.23
(58) Field of Search ........................... 296/97.23; 15/215, 15/216, 217; 428/95, 99, 100, 120, 136, 195, 76, 192

(56) References Cited

U.S. PATENT DOCUMENTS

| | | | | |
|---|---|---|---|---|
| 4,399,176 | * | 8/1983 | Bell et al. ............................... | 428/85 |
| 4,828,898 | * | 5/1989 | Bailey ..................................... | 428/88 |
| 5,021,277 | * | 6/1991 | Fan ......................................... | 428/76 |
| 6,027,781 | * | 2/2000 | Landry et al. ...................... | 428/40.1 |

* cited by examiner

*Primary Examiner*—Rena L. Dye
*Assistant Examiner*—Alicia Chevalier

(57) ABSTRACT

A floor mat cover for protecting a floor mat of a vehicle from soiling from use of the floor mat. The floor mat cover includes top and bottom panels coupled along their outer perimeters to define a pocket therebetween for receiving a floor mat therein. The bottom panel has a longitudinal slit therethrough defining an opening into the pocket.

1 Claim, 2 Drawing Sheets

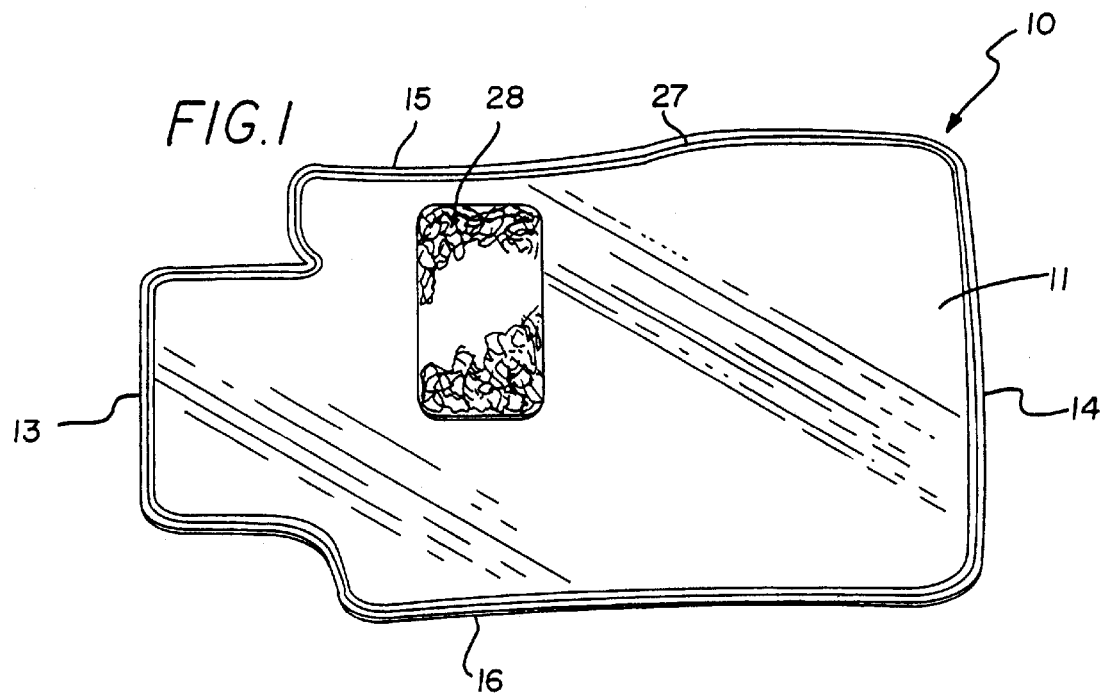
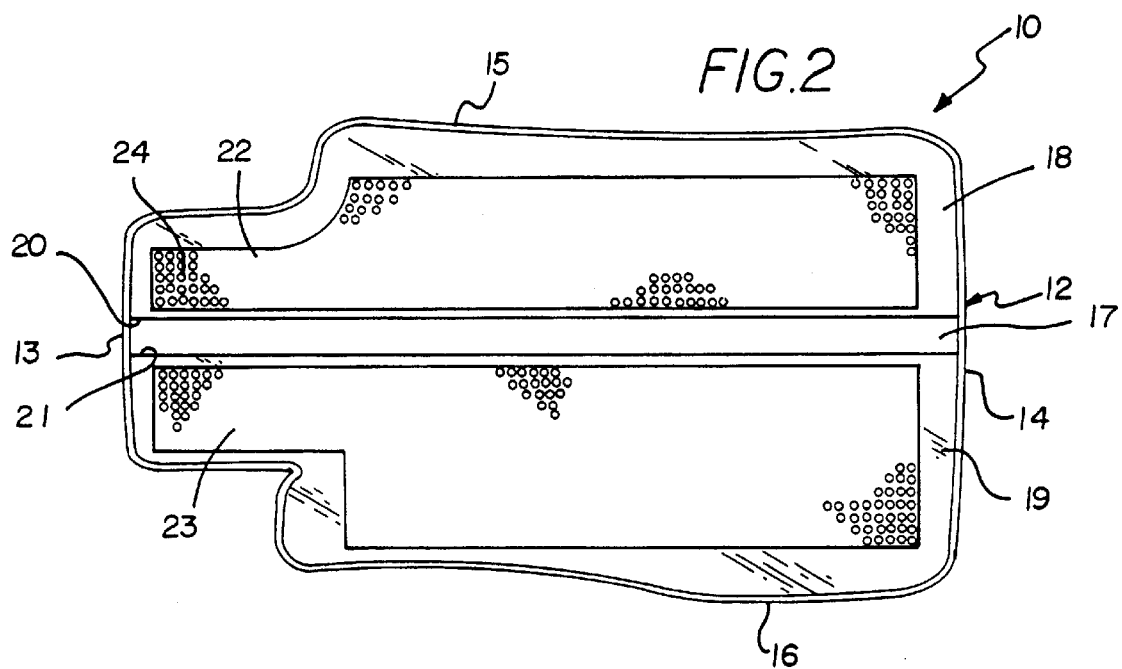

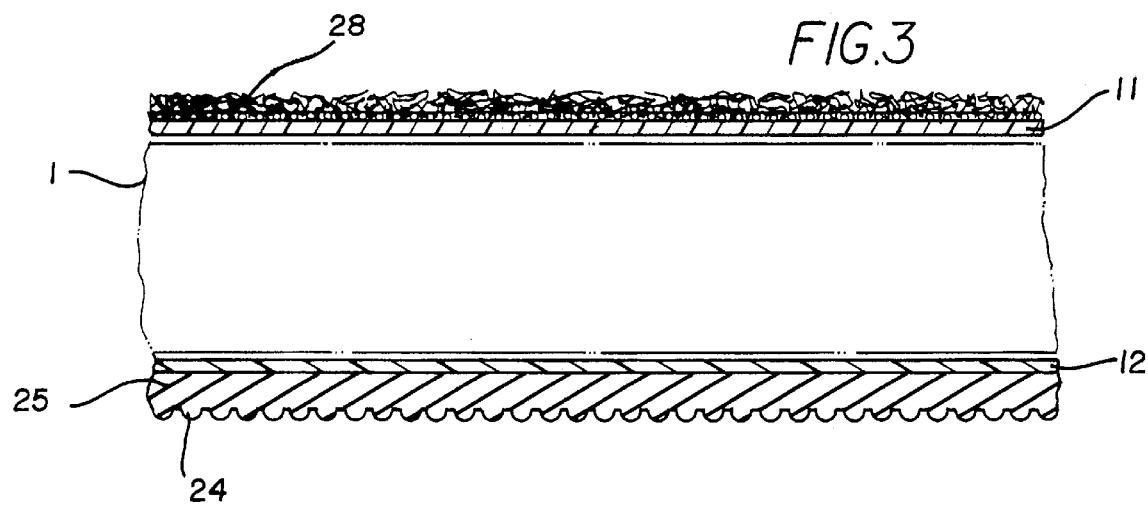
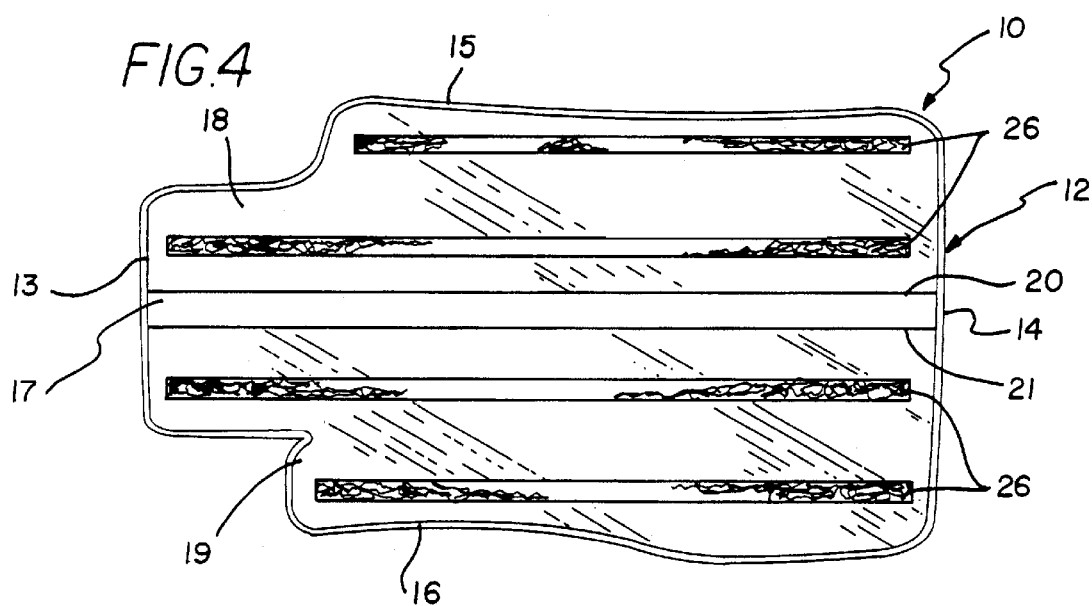

FLOOR MAT COVER

BACKGROUND OF THE INVENTION

1. Field of the Invention

The present invention relates to protective covers for vehicular floor mats and more particularly pertains to a new floor mat cover for protecting a floor mat of a vehicle from soiling from use of the floor mat.

2. Description of the Prior Art

The use of protective covers for vehicular floor mats is known in the prior art. More specifically, protective covers for vehicular floor mats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,793,149; U.S. Pat. No. 4,644,592; U.S. Pat. No. 5,236,753; U.S. Pat. No. 4,143,194; U.S. Pat. No. Des. 342,932; and U.S. Pat. No. 2,843,868.

While these devices fulfill their respective, particular objectives and requirements, the aforementioned patents do not disclose a new floor mat cover. The inventive device includes top and bottom panels coupled along their outer perimeters to define a pocket therebetween for receiving a floor mat therein. The bottom panel has a longitudinal slit therethrough defining an opening into the pocket.

In these respects, the floor mat cover according to the present invention substantially departs from the conventional concepts and designs of the prior art, and in so doing provides an apparatus primarily developed for the purpose of protecting a floor mat of a vehicle from soiling from use of the floor mat.

SUMMARY OF THE INVENTION

In view of the foregoing disadvantages inherent in the known types of protective covers for vehicular floor mats now present in the prior art, the present invention provides a new floor mat cover construction wherein the same can be utilized for protecting a floor mat of a vehicle from soiling from use of the floor mat.

The general purpose of the present invention, which will be described subsequently in greater detail, is to provide a new floor mat cover apparatus and method which has many of the advantages of the protective covers for vehicular floor mats mentioned heretofore and many novel features that result in a new floor mat cover which is not anticipated, rendered obvious, suggested, or even implied by any of the prior art protective covers for vehicular floor mats, either alone or in any combination thereof.

To attain this, the present invention generally comprises top and bottom panels coupled along their outer perimeters to define a pocket therebetween for receiving a floor mat therein. The bottom panel has a longitudinal slit therethrough defining an opening into the pocket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new floor mat cover apparatus and method which has many of the advantages of the protective covers for vehicular floor mats mentioned heretofore and many novel features that result in a new floor mat cover which is not anticipated, rendered obvious, suggested, or even implied by any of the prior art protective covers for vehicular floor mats, either alone or in any combination thereof.

It is another object of the present invention to provide a new floor mat cover which may be easily and efficiently manufactured and marketed.

It is a further object of the present invention to provide a new floor mat cover which is of a durable and reliable construction.

An even further object of the present invention is to provide a new floor mat cover which is susceptible of a low cost of manufacture with regard to both materials and labor, and which accordingly is then susceptible of low prices of sale to the consuming public, thereby making such floor mat cover economically available to the buying public.

Still yet another object of the present invention is to provide a new floor mat cover which provides in the apparatuses and methods of the prior art some of the advantages thereof, while simultaneously overcoming some of the disadvantages normally associated therewith.

Still another object of the present invention is to provide a new floor mat cover for protecting a floor mat of a vehicle from soiling from use of the floor mat.

Yet another object of the present invention is to provide a new floor mat cover which includes top and bottom panels coupled along their outer perimeters to define a pocket therebetween for receiving a floor mat therein. The bottom panel has a longitudinal slit therethrough defining an opening into the pocket.

Still yet another object of the present invention is to provide a new floor mat cover that may be transparent to permit viewing of the covered floor mat. The cover may also be tinted various colors to shade or give the covered floor mat a different color.

Even still another object of the present invention is to provide a new floor mat cover that protects carpeted floor mats from soiling from mud, snow, and slush brought into a vehicle on the shoes of a passenger.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic top side view of a new floor mat cover according to the present invention.

FIG. 2 is a schematic bottom side view of a preferred embodiment of the present invention.

FIG. 3 is a schematic cross sectional view of the preferred embodiment the present invention illustrated in FIGS. 1 and 2.

FIG. 4 is a schematic bottom side view of another preferred embodiment of the present invention.

DESCRIPTION OF THE PREFERRED EMBODIMENT

With reference now to the drawings, and in particular to FIGS. 1 through 4 thereof, a new floor mat cover embodying the principles and concepts of the present invention and generally designated by the reference numeral 10 will be described.

As best illustrated in FIGS. 1 through 4, the floor mat cover 10 generally comprises top and bottom panels 11,12 coupled along their outer perimeters to define a pocket therebetween for receiving a floor mat 1 therein. The bottom panel has a longitudinal slit 17 therethrough defining an opening into the pocket.

In closer detail, the cover 10 for a floor mat 1 of a vehicle comprises top and bottom panels 11 each having an outer perimeter comprising a front 13, a back 14, and a pair of sides 15,16. The outer perimeters of the top and bottom panels are preferably shaped to conform to the outer perimeter of a floor mat to be covered by the cover. The outer perimeters of the top and bottom panels are coupled together completely around their outer perimeters to define a pocket between the top and bottom panels designed for receiving a floor mat therein.

The bottom panel has a longitudinal slit 17 therethrough extending between the front and back of the bottom panel. The longitudinal slit defines an opening into the pocket to permit insertion and removal of a floor mat from the pocket. The longitudinal slit preferably divides the bottom panel into a spaced apart pair of panel portions 18,19. Each of the panel portions of the bottom panel has a generally straight side edge 20,21 defining a portion of a periphery of the longitudinal slit. The side edges of the panel portions of the bottom panel are preferably extended substantially parallel to one another.

The top and bottom panels each preferably comprise a flexible material to permit the cover to conform to the contours of the floor of a vehicle that the cover is laid on. Even more preferably, the top and bottom panels also each comprise a translucent material (ideally a relatively transparent material) to permit viewing through the cover of the floor mat in the pocket.

As illustrated in FIGS. 2 and 3, in one preferred embodiment, the panel portions of the bottom panel each have a frictionally enhanced region 22,23. Each of the frictionally enhanced regions has a plurality of raised nibs 24 downwardly extending therefrom. The raised nibs are designed for being placed in contact with the floor of the vehicle and holding the cover against sliding on the floor of the vehicle. Preferably, the raised nibs of each frictionally enhanced region are provided on a pad 25 coupled to the respective frictionally enhanced region. The pads are preferably substantially coextensive with the respective frictionally enhanced region. The raised nibs and the pads each comprise a resiliently deformable material such as a resiliently deformable rubber or plastic material for increasing the frictional coefficient of the frictionally enhanced regions. Ideally, the frictionally enhanced regions each occupy an area greater than about three-fourths of the total area of the respective panel portion and less than the total area of the respective panel portion for providing a sufficient surface area to contact the floor of the vehicle to help ensure that the bottom panel does not slid on the floor of the vehicle.

With reference to FIG. 4, in another preferred embodiment, instead of the frictionally enhanced regions, each of the panel portions of the bottom panel has a pair of elongate attachment strips 26 coupled thereto. Preferably, each of the attachment strips is extended between the front and back of the bottom panel. The attachment strips of each pair of attachment strips of each of the panel portions of the bottom panel are spaced apart from one another and preferably extend substantially parallel to one another. Each of the attachment strips is also preferably extended substantially parallel to the side edges of the panel portions of the bottom panel. Each of the attachment strips comprises a hooks portion of a hooks and loops fastener to permit releasable attachment of each attachment strip to a carpeted floor of a vehicle.

With reference to FIG. 1, the top panel preferably has a raised lip 27 upwardly extending around the outer perimeter of the top panel. The raised lip is designed for holding water, snow and ice on the top panel so that they do not spill onto the floor of the vehicle. Preferably, the top panel also includes a foot rest region 28. Preferably, the foot rest region is generally rectangular. The foot rest region of the top panel is preferably positioned closer towards the front of the top panel than to the back of the top panel and closer towards one of the sides of the top panel than to the other of the sides of the top panel so that the foot rest region is located in a position where the right heel of a user would rest on the floor of the vehicle. The foot rest region of the top panel is frictionally enhanced with respect to the rest of the top panel to help hold a foot of a user resting on the foot rest region from sliding on the top panel. Ideally, the foot rest region comprises carpet to frictionally enhance the foot rest region with respect to the rest of the top panel. Also ideally, the foot rest region of the top panel occupies an area less than about one-fourth of a total area bounded by the outer perimeter of the top panel so that the foot rest region does not obscure too much of the top of the floor mat in the pocket of the cover.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cover for a floor mat of a vehicle, comprising:

top and bottom panels each having an outer perimeter comprising a front, a back, and a pair of sides, said outer perimeters of a bottom panels being shaped to conform to an outer perimeter of a floor mat to be covered by said top and bottom panels;

outer perimeters of said top and bottom panels being coupled together to define a pocket between said top and bottom panels adapted for receiving a floor mat therein;

said bottom panel having a longitudinal slit therethrough extending between said front and back of said bottom panel, said longitudinal slit defining an opening into said pocket for permitting insertion and removal of the floor mat from said pocket;

said longitudinal slit dividing said bottom panel into a spaced apart pair of panel portions;

each of said panel portions of said bottom panel having a generally straight side edge defining a portion of a periphery of said longitudinal slit;

said side edges of said panel portions of said bottom panel being extended substantially parallel to one another;

said top and bottom panels each comprising a flexible material for permitting said top and bottom panels to conform to the contours of the floor of the vehicle, said top and bottom panels each comprising a translucent material;

said panel portions of said bottom panel each having a frictionally enhanced region, each of said frictionally enhanced regions having a plurality of raised nibs protruding therefrom for creating frictional resistance with a pile of a carpet of a vehicle, each of said nibs having a rounded tip for resisting puncture of a backing material of the carpet of the vehicle by said rounded tip of said nibs;

said raised nibs being adapted for being placed in contact with the floor of the vehicle and holding said panel portions against sliding on the floor of the vehicle;

wherein said raised nibs of each frictionally enhanced region are provided on a pad coupled to the respective frictionally enhcanced region, said pads being substantially coextensive with the respective frictionally enhanced region;

said raised nibs and said pads each comprising a resiliently deformable material for increasing the coefficient of friction of the frictionally enhanced regions;

said top panel having a raised lip upwardly extending around said outer perimeter of said top panel, said raised lip being adapted for holding water, snow and ice on the top panel so that water, snow and ice do not spill onto the floor of the vehicle;

said top panel having a foot rest region, said foot rest region being generally rectangular;

said foot rest region of said top panel being positioned closer towards said front of said top panel than to said back of said top panel, said foot rest region of said top panel being positioned closer towards one of said sides of said top panel than to the other of said sides of said top panel;

said font rest region of said top panel being frictionally enhanced with respect to said top panel to help hold a foot of a user resting on said foot rest region from sliding on said top panel, wherein said foot rest region comprises carpet for frictionally enhancing said foot rest region with respect to said top panel; and said foot rest region of said top panel occupying an area less than about one-fourth of a total area bounded by said outer perimeter of said top panel.

* * * * *